United States Patent [19]

Kukimoto et al.

[11] Patent Number: 4,755,717

[45] Date of Patent: Jul. 5, 1988

[54] FLUORESCENT DISPLAY APPARATUS

[75] Inventors: Hiroshi Kukimoto, Yokohama; Kiyoshi Morimoto; Hitoshi Toki, both of Mobara, all of Japan

[73] Assignee: Futaba Denshi Kogyo K.K., Nobara, Japan

[21] Appl. No.: 867,611

[22] Filed: May 27, 1986

Related U.S. Application Data

[63] Continuation of Ser. No. 566,775, Jan. 3, 1984, abandoned, which is a continuation of Ser. No. 422,358, Sep. 23, 1982, abandoned, which is a continuation of Ser. No. 222,622, Jan. 1, 1981, abandoned.

[30] Foreign Application Priority Data

Jan. 16, 1980 [JP] Japan ................................. 55-2540

[51] Int. Cl.$^4$ ............................................. C09K 11/54
[52] U.S. Cl. ................................ 313/496; 252/301.6 S
[58] Field of Search .................. 252/301.6 S; 313/496

[56] References Cited

U.S. PATENT DOCUMENTS

| | | | |
|---|---|---|---|
| 3,374,176 | 3/1968 | Potter | 252/301.6 S |
| 3,583,929 | 6/1971 | Lehmann | 257/301.6 S |
| 3,602,753 | 8/1971 | Evans | 252/301.6 S |
| 3,655,575 | 4/1972 | Faria | 252/301.6 S |
| 3,664,862 | 5/1972 | Kingsley | 252/301.6 S |
| 3,957,678 | 5/1976 | Dikhoff | 252/301.6 S |
| 4,275,333 | 6/1981 | Kagami | 252/301.6 S |

*Primary Examiner*—Jack Cooper
*Attorney, Agent, or Firm*—Oblon, Fisher, Spivak, McClelland & Maier

[57] ABSTRACT

There is disclosed a fluorescent composition exhibiting high luminance under low velocity electron excitation having the formula $(Zn_{1-x}Cd_x)S{:}Ag, Al$ wherein x is $0.25 \leq x \leq 0.95$, Ag is $1 \times 10^{-5}$ to $10^{-3}$ atom/mole and Al is $1.2 \times 10^{-3}$ to $5 \times 10^{-2}$ atom/mole and a fluorescent display apparatus containing the same.

5 Claims, 4 Drawing Sheets

FLUORESCENT DISPLAY APPARATUS

This application is a continuation of application Ser. No. 566,775, filed Jan. 3, 1984, now abandoned, which application is a continuation of application Ser. No. 422,358, filed Sept. 23, 1982, now abandoned, which is a continuation of application Ser. No. 222,622, filed Jan. 1, 1981, now abandoned.

BACKGROUND OF THE INVENTION

1. Field of the Invention:

This invention relates to a fluorescent composition, and more particularly to a fluorescent composition which can emit green, blue or red light under low velocity electron excitation under acceleration potential below 100 V.

2. Description of the Prior Arts:

A fluorescent display apparatus has been generally used in various electric or electronic display apparatus, because it can be driven with relatively low voltage, less power consumption, and exhibit bright and very clear displays. The fluorescent display apparatus performs the display of letters or patterns by impinging electrons emitted from filamentary cathodes when energized and heated upon anodes on which to deposit phosphor layers and to which to selectively apply anode voltage. The phosphor layers deposited on the anodes of the fluorescent display apparatus generally consists of a fluorescent composition which can give forth emission of high luminance by excitation of low velocity electrons, namely low acceleration voltage.

There is heretofore known a ZnO:Zn system fluorescent composition as a low velocity electron excited fluorescent composition which is used for the fluorescent display apparatus. The ZnO:Zn system fluorescent composition can be energized by luminance threshold voltage, that is, dead voltage of as low as 1 V to 2 V, and sufficient luminance for display can be obtained with anode voltage of 10 V to 20 V. Thus, it is extremely superior as the low velocity electron excited fluorescent composition. However, the ZnO:Zn system phosphor can only emit green light under electron excitation. Thus, the luminous color emitted from the fluorescent display apparatus using the ZnO:Zn system fluorescent composition is limited to green.

On the other hand, as the expansion of the applied field of the fluorescent display apparatus, there has been a great demand for diversification of the luminous color for display. For example, when effecting a warning signal, red is preferable for increasing the warning effect rather than green. Furthermore, when displaying several kinds of informations in one or plural fluorescent display apparatuses, each of the information can be correctly and extremely easy to recognize if the luminous color in each of the informations to be displayed is displayed in different colors. In order to meet such demand, various attempts have been made to develop a fluorescent composition which emits luminous color other than green by excitation of low speed electrons. For example, it has been proposed such low speed electron excited fluorescent compositions that are prepared by mixing various electric conductive materials with a ZnS:Ag or ZnS:Cu fluorescent composition used in the conventional cathode-ray tube which can emit various luminous color under high velocity electron excitation, or a (Zn, Cd)S:Ag or a $Y_2O_2S$:Eu fluorescent composition. Furthermore, it has also been proposed such a fluorescent composition that is prepared by mixing $SnO_2$ which is originally an electric conductive material with rare earth elements, such as, for example, Eu.

In the fluorescent composition which has been produced heretofore by mixing the electric conductive material with the fluorescent composition, the emission of high luminance is not obtainable due to decrease of the luminance area in the fluorescent composition by admixture of the non-luminance electric conductive material in the fluorescent composition, and also the luminance is liable to be in irregular if the electric conductive material is not uniformly mixed therewith. The $SnO_2$:Eu fluorescent composition made of $SnO_2$ to which Eu is added is not satisfactory in that it exhibits saturated characteristics under low luminance, and can not give forth emission of sufficient luminance. Therefore, it is unsatisfactory as a fluorescent composition for use in low velocity electron excitation. Thus, in the conventional fluorescent display apparatus with which a phosphor layer made of the fluorescent composition which is excited by low velocity electrons is provided in association with the ZnO:Zn phosphor layer in order to effect luminous display of different colors at the respective regions in one display portion, the driving circuit is complicated because of the difference in the luminance threshold voltage and the operating voltage of both phosphor layers. In addition each of the phosphor layers emits lights in different luminance, which makes the displays hard to observe. Furthermore, the operation life and the stability are not satisfactory.

SUMMARY OF THE INVENTION

The present invention is intended to eliminate the above-mentioned disadvantages of the prior art and to provide a novel fluorescent composition.

Therefore, it is an object of the present invention to provide a novel fluorescent composition which is low in luminance threshold voltage and can emit green, blue, or red light of sufficient brightness for display under low velocity electron excitation.

It is another object of the present invention to provide a novel fluorescent composition which does not include non-luminance electric conductive materials for improving the electric conductivity.

But decreasing luminance areas in the fluorescent composition. Therefore, it can give forth emission of sufficient luminance without accompanying irregular illumination or exhibiting saturated characteristics under low luminance which is observed in a $SnO_2$:Eu system fluorescent composition.

It is further object of the present invention to provide a novel fluorescent composition which is stable and exhibits excellent characteristics in the illumination stability and the life.

It is still another object of the present invention to provide a fluorescent display apparatus which can be energized by luminance threshold voltage of as low as 5 V to 6 V and emit green, blue or red light of sufficient brightness for display under low velocity electron excitation of 20 V to 50 V.

According to the present invention, the foregoing and the other objects are attained by providing a fluorescent composition consisting essentially of zinc-cadmium sulfide phosphors (hereinafter referred to as the general formula (Zn, Cd)S) activated with silver and containing aluminum wherein silver is present in an amount of from $1 \times 10^{-5}$ to $10^{-3}$ gram atom per gran mole of the zinc-cadmium sulfide and aluminum is present in an amount of from $1.2 \times 10^{-3}$ to $5 \times 10^{-2}$ gram atom per gram mole of the zinc-cadmium sulfide. The silver activated and aluminum added zinc-cadmium sulfide phosphor is known as a phosphor for use in a cathode-ray tube which is energized and illuminated by electron rays accelerated by the voltage of several hundred volts or several tens kilovolts. According to the present invention, the activator quantities of silver and the coactivator quantities of aluminum which will be donor impurities within the (Zn, Cd)S host material have been determined in the above ranges after extensive research and experiment as to the amounts of silver and aluminum to be added to the host material. In the fluorescent composition according to the present invention, the amount of aluminum is present in higher concentration than that of silver in the host material, thereby increasing the donor concentration and electric conductivity of the fluorescent composition so as to be suitable for use in low velocity electron excited fluorescent display apparatuses.

BRIEF DESCRIPTION OF THE DRAWINGS

Various other objects, features and attendant advantages of the present invention will be more fully appreciated as the same becomes better understood from the following detailed description when considered in connection with the accompanying drawings; wherein.

DETAILED DESCRIPTION OF THE PREFERRED EMBODIMENTS

Figure 1:
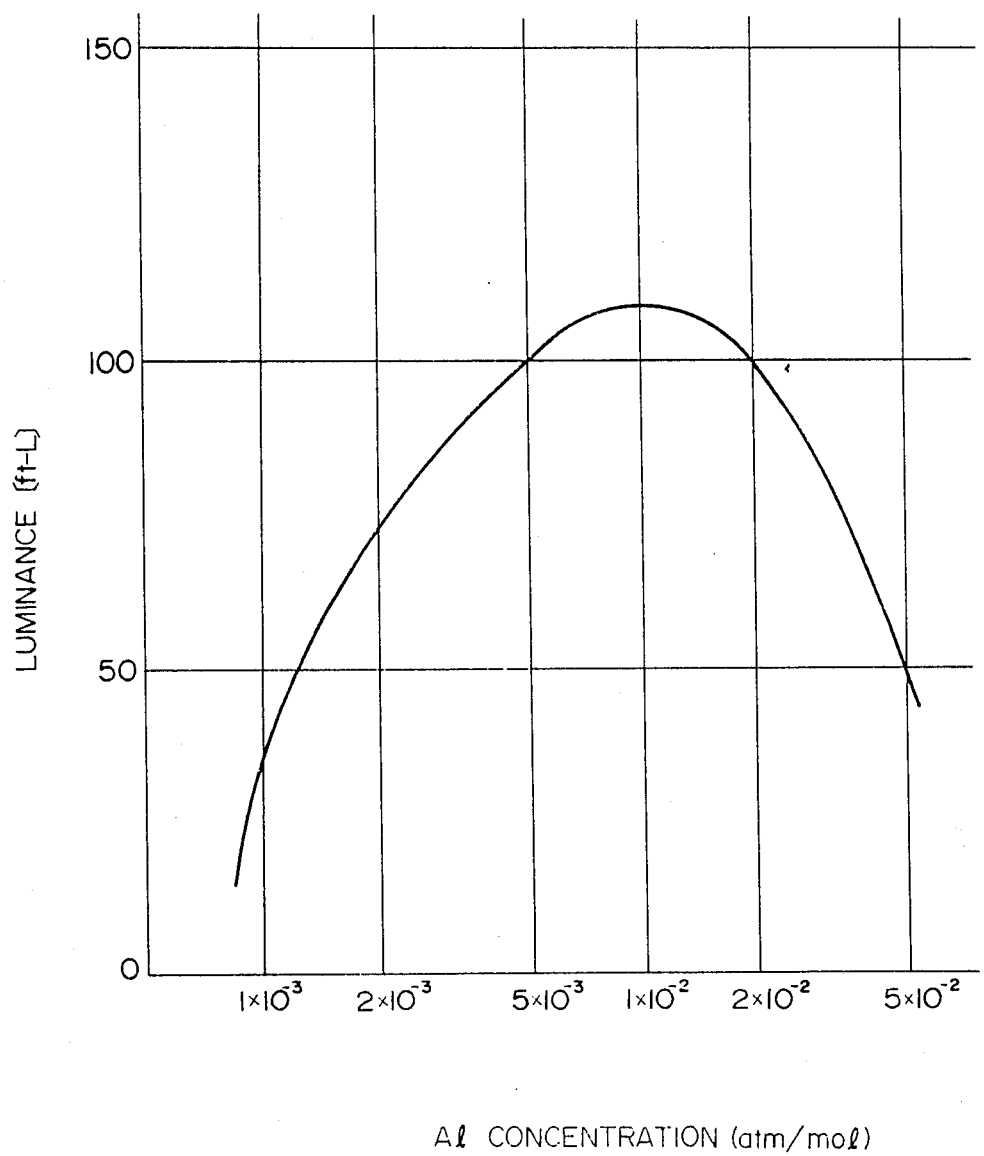
FIG. 1 is a diagram illustrating variation of luminance of a fluorescent composition with aluminum concentration.

Referring now to a preferred embodiment of the present invention, a fluorescent composition according to the present invention includes a mixed crystal of (Zn, Cd)S as a host material of the fluorescent composition. The mixed crystal can be represented by the formula $(Zn_{1-x}Cd_x)S$, wherein x is the mixed crystal ratio of Cd. The $(Zn_{1-x}Cd_x)S$ can shift its band gap from 3.7 eV to 2.4 eV by changing the mixed crystal ratio x. In other words, the fluorescent composition incorporating the $(Zn_{1-x}Cd_x)S$ host material can emit luminous colors having a range from blue to red. In this instance, if the mixed crystal ratio x of Cd is smaller, the electric conductivity of the host material is damaged. Therefore, the mixed crystal ratio x must be above 0.25, and its upper limit must be 0.95 in the light of the range for obtaining the red emission, namely, the mixed crystal ratio x must be within the extent of $0.25 \leq x \leq 0.95$.

In the present invention, the $(Zn_{1-x}Cd_x)S$ host material is prepared by the following manners. First, a predetermined amount of ZnS and CdS powders is prepared based upon the mixed crystal ratio x, and then these particles are heated and fired together with a flux of NaCl for preparing the mixed crystal in a quartz boat. The firing is conducted in an atmosphere of flowing $N_2$ gas at a temperature ranging from about 800° C. to about 900° C. for about an hour. After natural cooling, the $(Zn_{1-x}Cd_x)S$ is obtained. Then, the $(Zn_{1-x}Cd_x)S$ is pulverized in an agate mortar and rinsed to remove the flux of NaCl incorporated in the $(Zn_{1-x}Cd_x)S$.

In the next stage, impurities of Ag and Al are added to the $(Zn_{1-x}Cd_x)S$ host material. In the present invention, Ag and Al are incorporated in the host material in various compound forms, and $AgNo_3$ and $Al_2(SO_4)_3$ are used in the example of the present invention. The amount of Ag added to the host material is $1 \times 10^{-5}$ to $10^{-2}$ gram atom per gram mole of the $(Zn_{1-x}Cd_x)S$ host material and the amount of Al added to the host material is $1.2 \times 10^{-3}$ to $5 \times 10^{-2}$ gram atom per gram mole of the $(Zn_{1-x}Cd_x)S$ host material. Ag and Al are incorporated in the host material in such a manner that the $(Zn_{1-x}Cd_x)S$ host material is dipped in aqueous solution of $AgNo_3$ and $Al_2(So_4)_3$. The host material is dried and the $(Zn_{1-x}Cd)S$ coated with Ag and Al is obtained. Then, it is fired at a temperature ranging from about 600° C. to about 100° C. for 1 to 10 hours in a quartz boat. The firing may be conducted at the elevated temperature in an atmosphere of flowing flux gas of $H_2S$ so that Cl remaining in the powders may be removed in the form of HCl. In this instance, if the amount of Al added to the host material is equivalent to that of Ag or 120% of Ag, electric charges of the acceptor of Ag and the donor of Cl and Al are compensated and the increase in the electric conductivity of the fluorescent composition can not be expected. Accordingly, the amount of Al added to the host material must be within the range of $1.2 \times 10^{-3}$ to $5 \times 10^{-2}$ atom/mole in the present invention.

FIG. 1 shows variation of luminance with Al concentration. As shown in FIG. 1, the luminance starts to increase with Al concentration of approximately $1.2 \times 10^{-3}$ atom/mole and the quantum efficiency continues to improve as the Al concentration is increased. A peak quantum efficiency is observed with the Al concentration of approximately $1.0 \times 10^{-2}$ atom/mole and then the luminance falls as the Al content is increased. The maximum Al concentration for achieving the luminance which is acceptable in the fluorescent composition of the present invention is $5 \times 10^{-2}$ atom/mole as shown in FIG. 1. In FIG. 1, the abscisse represents the Al concentration (atom/mole) and the ordinate represents the luminance of the fluorescent composition which is energized at the acceleration voltage of 30 V. The characteristics shown in FIG. 1 is obtained from the fluorescent composition having the mixed crystal ratio x of 0.8 and incorporating $1 \times 10^{-4}$ atom/mole of Ag which gives forth a red emission.

In this manner, the fluorescent composition according to the present invention which has the formula $(Zn_{1-x}Cd_x)S$: Ag, Al is prepared. In the fluorescent composition according to the present invention, the Al concentration is more than one order higher as compared with the Ag concentration and relatively shallow donor level (approximately 100 meV) is formed in the host material, which results in improvements in the electric conductivity of the fluorescent composition. Thus, the fluorescent composition according to the present invention can give rise to the emission of sufficient brightness for display under the excitation of low velocity electrons which are accelerated by the voltage of several volts to several tens volts. Furthermore, the luminous colors having the range of bluish-green to red can be emitted from the fluorescent composition under the excitation of low velocity electrons by changing the mixed crystal ratio x in the host material within the extent of $0.25 \leq x \leq 0.95$.

Reference will now be made to a fluorescent display apparatus according to the present invention to which the $(Zn_{1-x}Cd_x)S:Ag$, Al phosphor explained hereinabove is applied in connection with FIGS. 2 and 3.

Figure 2:
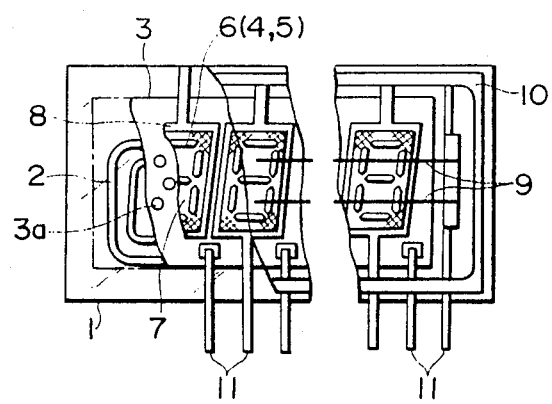
FIG. 2 is a partly cutaway plan view of a fluorescent display apparatus to which a fluorescent composition according to the present invention is applied.
Figure 3:
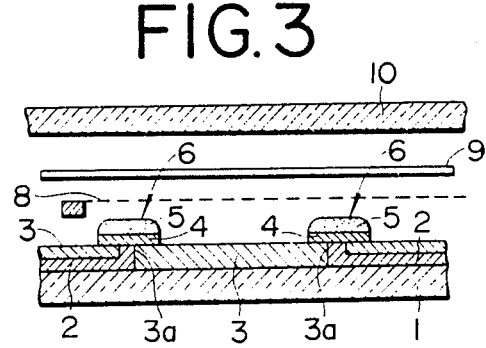
FIG. 3 is a fragmentary enlarged sectional view of the fluorescent display apparatus shown in FIG. 2.

The fluorescent display apparatus shown in FIGS. 1 and 2 comprises a substrate 1 made of an electric insulating material, such as, for example, glass or ceramic, wiring conductors 2 deposited on the substrate 1, and an electric insulating layer 3 deposited on the wiring conductors 2 which includes through-holes 3a at the corresponding positions of the wiring conductors 2. The insulating film layer 3 is essentially made of a low melting frit glass with which a binder, organic solvent and a pigment such as a black pigment are mixed to form the paste which is printed and baked on the surface of the wiring conductors 2.

Reference numeral 4 designates anode conductors formed on the insulating film layer 3 in the shape of, for instance, the letter "8". A phosphor layer 5 which is made of the $(Zn_{1-x}Cd_x)S:Ag$, Al fluorescent composition by the process explained hereinabove is deposited on the anode conductors 4 by the conventional screen printing, electrodeposition, precipitation method or the like, thereby forming anodes 6. The anodes 6 are arranged in the shape of the letter "8" as shown in FIG. 2 thereby to form a pattern display portion 7. In this manner, an anode substrate is prepared.

. The anode substrate is airtightly sealed by a flat-bottom boat shaped front cover 10 having a transparent viewing window at the peripheral portions of the substrate 1 to provide highly evacuated casing in which a mesh-shaped control electrode 8 disposed above the pattern display portion 7 in an opposed relationship therewith and a filamentary cathode 9 for emitting electrons when electrically heated are contained. Lead-in wires 11 air-tightly passing through the peripheral sealing portions between the substrate 1 and the upper cover 10 are electrically connected to the respective electrodes so that a drive signal may be supplied with each of the electrodes.

As is apparent, the fluorescent display apparatus according to the present invention shown in FIG. 1 is the conventional numeral display fluorescent wherein the phosphor layer 5 is formed of the $(Zn_{1-x}Cd_x)S:Ag$, Al fluorescent composition according to the present invention.

Figure 4:
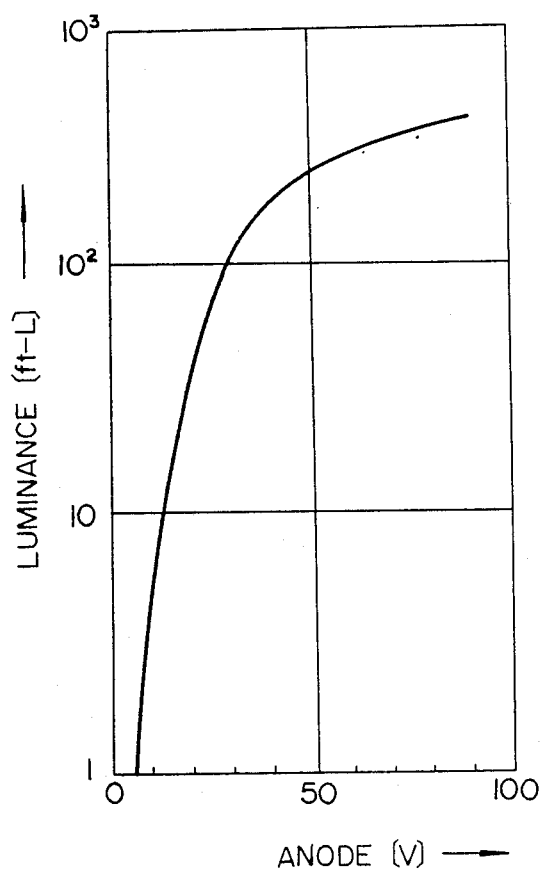
FIG. 4 is a diagram illustrating the relationship between luminance of emission and anode voltage applied to a red emitting fluorescent display apparatus according to the present invention.

Reference will now be made to luminescent characteristics of the fluorescent display apparatus shown in FIGS. 2 and 3 when applying heating voltage to the cathode 9, control voltage to the control electrode 8 and anode voltage to the anode 6. FIG. 4 shows the luminescent characteristics of the phosphor layer 5 which is made of the $(Zn_{0.15}Cd_{0.85})S:Ag$, Al fluorescent composition having the mixed crystal ratio x of 0.85 and giving forth a red emission.

In FIG. 4, the abscissa represents the anode voltage and the ordinate represents the luminance of the anode 6 which is expressed in ft lamberts (ft-l). As is apparent from FIG. 4, the anode 6 is begun to give forth a red emission at the anode voltage of above 5 to 6 V and exhibits the luminance of approximately 100 ft-L. at the anode voltage of 20 V to 30 V and the sufficient luminance for display can be obtained. In the fluorescent display apparatus according to the present invention, the luminance threshold voltage is as low as 5 to 6 V and the operating voltage necessary for effecting the display is 20 V to 50 V, thereby obtaining almost the same luminescent characteristics as those in a fluorescent display apparatus which uses the conventional ZnO:Zn system fluorescent composition. Furthermore, the phosphor layer 5 does not contain non-luminance electric conductive materials for improving the electric conductivity which decrease luminance areas in the fluorescent composition and result in irregular illumination. Therefore, in the fluorescent display apparatus according to the present invention, it is possible to effect the quality display and there exhibits no saturated characteristics under low luminance which is observed in a $SnO_2$:Hu system fluorescent composition. The display of the red emission effected by the fluorescent display apparatus according to the present invention cannot be attained by the conventional ZnO:Zn system fluorescent composition.

As explained hereinabove, the luminous color emitted from the $(Zn_{1-x}Cd_x)S:Ag$, Al fluorescent composition can be changed within the range of bluish-green to red by shifting the mixed crystal ratio x in the host material.

Figure 5:
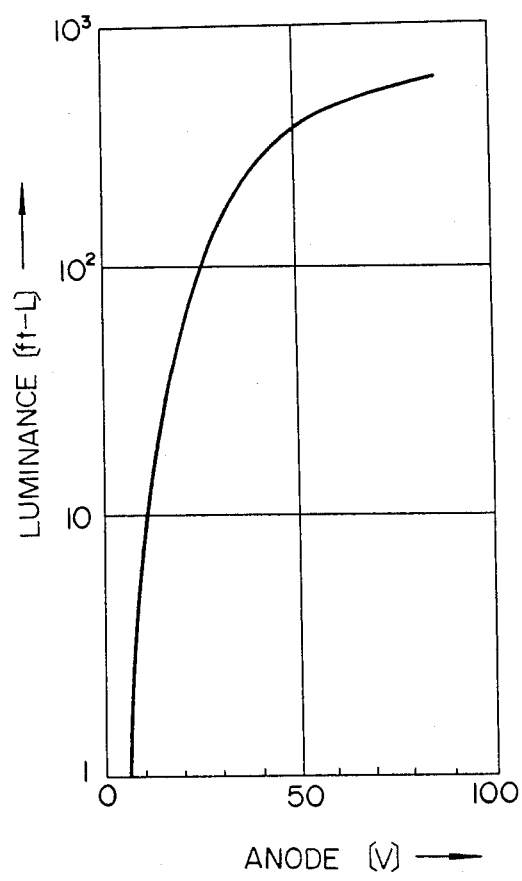
FIG. 5 is a diagram illustrating the relationship between luminance of emission and anode voltage applied to a yellow emitting fluorescent display apparatus according to the present invention.
Figure 6:
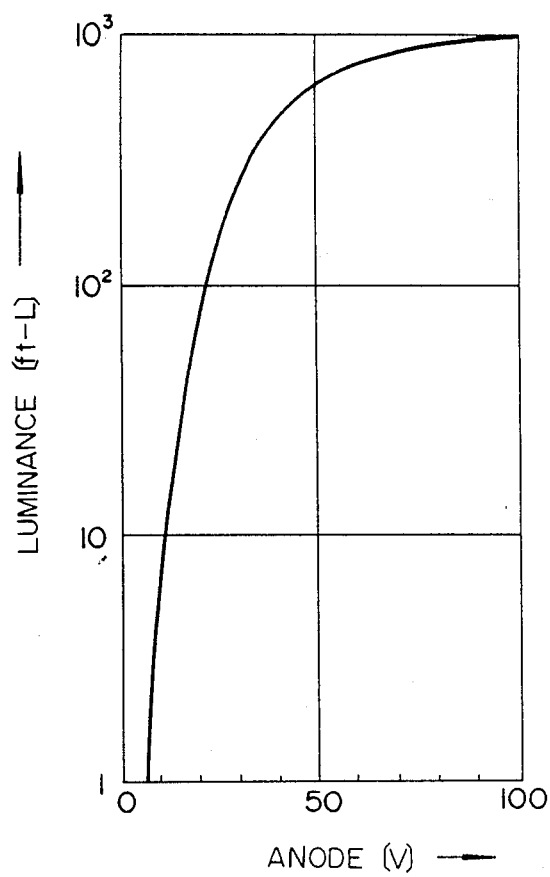
FIG. 6 is a diagram illustrating the relationship between luminance of emission and anode voltage applied to a green emitting fluorescent display apparatus according to the present invention.

FIGS. 5 and 6 show luminescent characteristics of the fluorescent display apparatus according to the present invention to which the $(Zn_{1-x}Cd_x)S:Ag$, Al fluorescent compositions having the mixed crystal ratio x of 0.5 and 0.3 are applied, respectively. FIG. 5 shows the luminescent characteristics of the fluorescent display apparatus to which the $(Zn_{0.5}Cd_{0.5})S:Ag$, Al fluorescent composition which emits yellow is applied. FIG. 6 shows the luminescent characteristics of the fluorescent display apparatus to which the $(Zn_{0.7}Cd_{0.3})S:Ag$, Al fluorescent composition which emits green is applied. As is apparent from the luminescent characteristics shown in FIG. 5 and 6, the luminance threshold voltage in either of the fluorescent display apparatuses in 5 V to 6 V and the luminance sufficient for effecting the display is obtained by the application of the anode voltage of 20 to 50 V.

In the present invention, it is possible to provide the fluorescent display apparatus which gives rise to the color emission within the range of bluish-green to red by suitably selecting the mixed crystal ratio of within the extent of $0.25 \leq x \leq 0.95$ and is driven by the almost same luminance threshold voltage and the operating voltage as those in the fluorescent display apparatus which uses the ZnO:Zn system phosphor. Accordingly, in an alternate embodiment of the present invention, it is possible to provide a fluorescent display apparatus which includes a plurality of display portions formed of the ZnO:Zn system phosphor layer and the $(Zn_{1-x}Cd_x)S$: Ag, Al phosphor layer so as to effect multi color displays, An example of such a fluorescent display apparatus is shown in FIG. 7.

Figure 7:
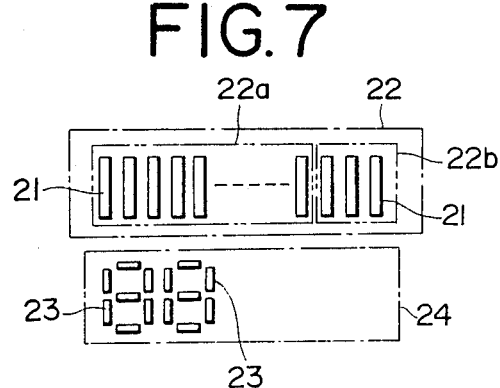
FIG. 7 is a plan view of a display portion of a fluorescent display apparatus according to another embodiment of the present invention.

The fluorescent display apparatus shown in FIG. 7 includes an analog display portion having anodes 21 which are linearly arranged and coated with a phosphor layer made of the low velocity electron excited fluorescent composition according to the present invention and a digital display portion 24 having anodes 23 which are arranged in the shape of the letter "8" and coated with a phosphor layer made of the low velocity electron excited fluorescent composition according to the present invention or the conventional ZnO:Zn system fluorescent composition. The phosphor layers deposited on each of the anodes 21 and 25 are those which emit different luminous colors for permitting the analog and digital displays in the respective display portions in the different colors so that the analog display portion 22 and the digital display portion 24 can be extremely easy to descriminate, thereby obtaining the displays which are easy to observe In the fluorescent display apparatus shown in FIG. 7, the analog display portion 22 is divided into two sections 22a and 22b and each of the sections is coated with the fluorescent composition which is excited by the low velocity electrons and emits different luminous colors. This fluorescent display apparatus is extremely effective for representing a signal which exceeds to a predetermined value in the different colors so as to bring about the warning effect.

It should be understood that the anode for forming the display portion of the fluorescent display apparatus is not limited to the particular shape shown in the drawings. In another embodiment of the present invention, it may be formed in the shape of a dot. In this instance, a plurality of the dot shaped anodes are arranged in a matrix form, which are, in turn, divided into a plurality of sections each coated with phosphor layers according to the present invention which omit different luminous colors. Then, a graphical display apparatus which is superior is a display apparatus which is superior in a display effect can be formed. In the graphical display apparatus thus formed, there is little luminance irregularity in each of the sections and it can be driven with a simple driving circuit, because the luminance threshold voltage and the operating voltage of the phosphor layers in each of the display sections are almost equivalent.

In the embodiments explained hereinabove, reference has been made to the fluorescent composition of the present invention which is applied to the fluorescent display apparatus. However, it should be understood that the fluorescent composition of the present invention is applicable not only to the fluorescent display apparatus but also to other display apparatuses. For instance, if the fluorescent composition of the present invention is applied to a plasma display apparatus which generates the low velocity electron rays in generated gas plasma, it is possible to effect multicolor displays and improve the display function in the plasma display apparatus.

As explained hereinabove, the fluorescent composition according to the present invention consists of the $(Zn_{1-x}Cd_x)S$ host material activated with $1\times10^{-5}$ to $10^{-2}$ atom/mole of Ag and containing $1.2\times10^{-2}$ to $5\times10^{-2}$ atom/mole of Al which becomes donors in the host material and decreases in electric resistance of the fluorescent composition. The fluorescent composition according to the present invention is subjected to satisfactorily decrease its electric resistance, and the luminance threshold voltage is approximately 5 V and the luminance which is sufficient for display and is 1.5 to 2.0 times higher than that of the conventional fluorescent composition is obtained by the application of the voltage as low as 20 to 50 V. Thus, it is suitable for the low velocity electron excited fluorescent composition. Furthermore, the fluorescent composition according to the present invention does not contain non-luminance substances which cause irregular illuminations, and gives rise to emissions of sufficient brightness excited by the low velocity electrons and various luminous colors within the range of bluish-green to red can be selectively generated by changing the mixed crystal ratio in the host material.

In addition, in the fluorescent display apparatus according to the present invention to which the fluorescent composition explained hereinabove is applied, it is possible to effect the multi-color display which significantly improves the display effect when representing the warning indication or multiple informations in one display device. According to the present invention, a color plannar display apparatus served for the conventional color cathode ray tube could be formed, and the display apparatus can be diversified and endowed with multiple functions. In the fluorescent composition according to the present invention, the luminance threshold voltage and the operating voltage are substantially equivalent to those of the conventional ZnO:Zn system phosphor, thus, each of the display portions emitting the different luminous colors can be driven with the simple driving circuits and can give forth the emission of even brightness.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a fluorescent display apparatus for effecting an luminous display by impinging electrons emitted from a filamentous cathode upon anodes by means of low velocity electron excitation the improvement comprising a phosphor layer deposited on the anodes consisting essentially of a zinc-cadmium sulfide host material having the general formula of $(Zn_{1-x}Cd_x)S$ wherein x is $0.25 \leq x \leq 0.95$, silver added to the host material in an amount of from $1\times10^5$ to $10^{-3}$ gm atom per gm mole of the zinc-cadmium sulfide, and aluminum added to the host material in an amount of from $1.2\times10^{-3}$ to $5\times10^{-2}$ gm atom per gm mole of the zinc-cadmium sulfide, wherein the aluminum concentration is more than one order of magnitude higher than the silver concentration, wherein said anodes do not include non-luminance electrical conductive materials within the phosphor layer, and wherein said fluorescent display apparatus exhibits a luminance threshold voltage of about 5 to 6 V.

2. The fluorescent display apparatus as defined in claim 1 wherein x is 0.85.

3. The fluorescent display apparatus as defined in claim 1 wherein x is 0.5.

4. The fluorescent display apparatus as defined in claim 1 wherein x is 0.3.

5. The fluorescent display apparatus as defined in claim 1 wherein x is 0.8.

* * * * *